(12) United States Patent
Unteregger

(10) Patent No.: US 6,986,476 B2
(45) Date of Patent: Jan. 17, 2006

(54) FOOD PROCESSOR WITH DIFFERENT TOOLS

(75) Inventor: Johann Unteregger, Klagenfurt (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 331 days.

(21) Appl. No.: 10/208,669

(22) Filed: Jul. 30, 2002

(65) Prior Publication Data

US 2003/0037685 A1 Feb. 27, 2003

(30) Foreign Application Priority Data

Aug. 21, 2001 (EP) .............................. 01890240

(51) Int. Cl.
*A47J 43/046* (2006.01)

(52) U.S. Cl. .................. 241/101.1; 241/282.2
(58) Field of Classification Search ............ 241/101.01, 241/101.1, 92, 101.2, 282.1, 282.2
See application file for complete search history.

(56) References Cited

FOREIGN PATENT DOCUMENTS

| DE | 3545226 A1 | * | 6/1987 |
| EP | 0156137 A1 | | 10/1985 |
| FR | 2787311 A1 | | 6/2000 |

* cited by examiner

*Primary Examiner*—Mark Rosenbaum

(57) ABSTRACT

A food processor (1) with two bowls (20, 21), which are of different constructions and each comprise a bottom wall (22, 31) and a tubular inner portion (28, 34) rising from the bottom wall (22, 31) into the bowl interior, comprises two transmission pieces (60, 61) which are preferably of different constructions and by means of which the formation of an inadmissible combination of a bowl (20, 21) and a tool (42, 45, 46), which can be introduced into the bowl (20, 21) and is associated with one of the bowls (20, 21), can be prevented in a simple manner.

9 Claims, 4 Drawing Sheets

FOOD PROCESSOR WITH DIFFERENT TOOLS

The invention relates to a food processor with a first bowl and a second bowl, which bowls are of different construction and are designed to be positioned on a support surface of the food processor and which each have a bottom wall and a tubular inner portion rising from the bottom wall into the interior of the bowl, which portion has a first end remote from the bottom wall and a second end facing the bottom wall and is open at both ends, and with drive means arranged adjacent the support surface for driving tools of the food processor, and with at least two tools, which tools are of different designs, each tool being associated with one bowl, and with a first transmission piece and a second transmission piece, each of which is associated with a respective bowl and is designed for driving a tool.

It is possible with such a food processor to process different foods requiring different treatments in different bowls by means of different tools, such that each tool can be driven by the drive means of the kitchen machine via a suitable transmission piece. It is necessary in such a food processor that the processing of foods in a bowl can only be carried out with a tool fitting the bowl in question, i.e. that the processing of foods can take place with an admissible combination of a bowl and a tool, whereas inadmissible combinations of a bowl and a tool must not be created, because such inadmissible combinations may lead to damage to a tool or a bowl and may lead to an undesirable risk of injury of a user of the food processor.

A food processor with the construction described in the first paragraph above is known from the patent document DE 42 20 234 C2. In this known food processor, the transmission pieces are integral components of the respective bowl, which has the result that each such bowl must be fitted with such a transmission piece. If such a bowl should become damaged so as to become inoperable, therefore, not only the bowl, but also the transmission piece connected to the bowl is to be exchanged, which represents an unnecessary waste. The known food processor comprises a solution for preventing the creation of an inadmissible combination of a bowl and a tool in that a tool portion permanently connected to a tool and a bowl portion permanently connected to a bowl are utilized, which portions abut against one another in the inadmissible situation, which implies that a construction necessary for this preventive measure must be realized for each tool as well as for each bowl.

The invention has for its object to prevent a creation of inadmissible combinations of a bowl and a tool in a constructionally simple and reliable manner. Furthermore, the invention has for its object to prevent a creation of inadmissible combinations in a manner such that the solution disclosed in the patent document DE 42 20 234 C2 is not utilized.

To achieve the above object, a food processor according to the invention is given inventive features such that a food processor according to the invention may be characterized as follows:

A food processor with a support surface and with a first bowl and a second bowl, which bowls are of different constructions, are designed for being placed on the support surface, each comprise a bottom wall, and each comprise a tubular inner portion rising from the bottom wall into the interior of the bowl, which inner portion has a first end remote from the bottom wall and a second end facing the bottom wall and is open at both ends, and with drive means arranged adjacent the support surface for driving tools of the food processor, and with at least two tools, which tools are of different constructions and are each associated with a respective bowl, and with a first transmission piece and a second transmission piece, which transmission pieces are permanently connected neither to a bowl nor to the drive means, wherein each transmission piece is associated with a respective bowl and with at least one tool, can be introduced by at least a portion into the tubular inner portion of the associated bowl, and is constructed such that a transmission connection to the drive means and to a tool associated with the transmission piece can be realized and such that a transmission connection to a tool not associated with the respective transmission piece is prevented.

The features according to the invention prevent a creation of inadmissible combinations of a bowl and a tool not belonging to this bowl in a reliable manner by constructionally simple and very cost-effective means in that the prevention of said inadmissible combinations according to the invention is achieved by means of the transmission pieces. The use of the transmission pieces for the preventive purpose mentioned above is advantageous in particular because such transmission pieces can be manufactured very inexpensively and can accordingly be replaced without comparatively high expense in cases in which damage or excessive wear of such a transmission piece renders the latter useless or makes that it can no longer fulfill its preventive function in a reliable manner. A further advantage of the measures according to the invention is that the prevention of the creation of an inadmissible combination of a bowl and a tool is not achieved by means of a tool component permanently connected to a tool and a bowl component permanently connected to a bowl, but by means of the transmission pieces, which are permanently connected neither to a bowl nor to a tool, but which instead may be brought into a detachable connection both with a bowl and with a tool and can accordingly be separated again therefrom.

It should be noted that the patent document DE 42 42 289 C2 discloses a food processor which is also fitted with a first bowl and a second bowl, and wherein at least one tool is associated with each bowl, while only the tool associated with a given bowl can be made to form an admissible combination with the relevant bowl in each case. A solution for preventing the creation of an inadmissible combination of a bowl and a tool is also provided in the food processor known from the patent document DE 42 42 289 C2, wherein a tool component permanently connected to a tool and a bowl component permanently connected to a bowl are utilized, which components abut against one another in the situation to be prevented, as was the case in the food processor known from the patent document DE 42 20 234 C2 cited further above. It should further be noted with respect to the food processor known from the patent document DE 42 42 289 C2 that no transmission pieces are provided in this known food processor, because the drive means for driving the tools in this known food processor are passed through the tubular inner portion of a bowl, so that the drive means project from the tubular inner portion in the region of the first end of the tubular inner portion of the bowl, which renders it possible for each of the tools to be brought into direct operational connection with the drive means without a transmission piece being required for driving the tools. The patent document U.S. Pat. No. 5,297, 475 A may also be cited in this connection.

The transmission pieces in a food processor according to the invention may be of the same construction. It was found to be highly advantageous, however, if the transmission pieces are of different constructions. This embodiment supports the avoidance of erroneous efforts to realize an inadmissible combination of bowl, transmission piece, and tool.

It was found to be advantageous in a food processor according to the invention if in addition the measures of claim 3 or the measures of claim 4 are provided. It is achieved thereby that the bowl is to be combined with the transmission pieces associated with the bowl in question in different manners, so that a user of the food processor is made aware of the different combinations of bowl and tool by means of the different combination conditions.

It was found to be particularly advantageous in a food processor according to the invention if in addition the features of claim 5 or claim 6 are provided. These solutions were found to be very advantageous as regards as simple as possible a construction and a reliable operation in spite of the simplicity.

It was furthermore found to be very advantageous in a food processor according to the invention if in addition the features of claim 7 or claim 8 are provided. These solutions were also found to be particularly advantageous as regards a construction which is as simple as possible and leads to a reliable operation.

It was furthermore found to be advantageous in a food processor according to the invention if in addition the features of claim 9 are provided. This solution was found to be particularly advantageous in tests.

The invention further relates to transmission pieces for a food processor.

The above and further aspects of the invention will become clearer in the ensuing description of an embodiment and are clarified with reference to this embodiment.

The invention will be explained in more detail below with reference to an embodiment shown in the drawings, to which, however, the invention is not limited.

Figure 1:
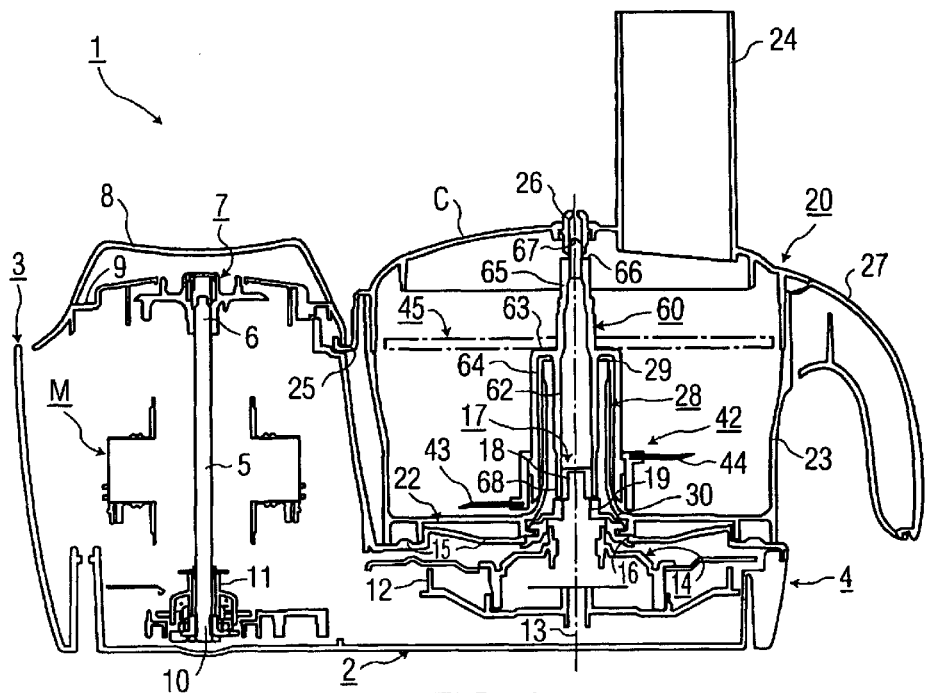
FIG. 1 shows a food processor in an embodiment of the invention in which a first bowl is positioned on a support surface of the food processor and a first transmission piece and a first tool have been inserted into the first bowl.

FIGS. 1 to 5 show a food processor 1. The food processor 1 has a housing 2. The housing 2 surrounds a tower-shaped region 3 and a plate-shaped region 4 extending laterally away from the tower-shaped region 3 of the food processor 1. A drive motor M is accommodated in the tower-shaped region 3 and is capable of driving a drive shaft 5 into rotation, at different speeds. First drive means 7 are connected to one end 6 of the drive shaft 5 and can be covered with a removable closing cap 8 of the food processor 1. After the closing cap 8 has been removed, a blender jug (not shown in the Figures) can be positioned on an annular housing surface 9, while a mixing tool provided in the blender jug is brought into operational connection with the first drive means 7 via a transmission.

At the other end 10 of the drive shaft 5, a small belt pulley 11 is fixedly connected to the drive shaft 5. The small belt pulley 11 is capable of driving a large belt pulley 12 with different speeds via a transmission belt not shown in the Figures. The large belt pulley 12 is rotatably supported on a shaft 13. A transmission gear 14, merely indicated in the Figures, can be driven by the large belt pulley 12. The transmission gear 14 is arranged adjacent to a support surface 15 of the housing 2. Part of the transmission gear 14 is passed through a passage 16 in the support surface 15. The portion of the transmission gear 14 passed through the passage 16 in the support surface 15 forms second drive means 17 of the food processor 1, which second drive means 17 are positioned adjacent the support surface 15 here. The second drive means 17 are designed for driving tools of the food processor 1, which will be explained in more detail further below.

The second drive means 17 comprise a first drive part 18 and a second drive part 19 which is arranged coaxially with the first drive part 18. The two drive parts 18 and 19 are coaxial with the shaft 13. When the drive means 17, and accordingly the two drive parts 18 and 19, are driven, the first drive part 18 is driven at a higher speed than the second drive part 19.

The food processor 1 is fitted with a first bowl 20 and a second bowl 21. The two bowls 20 and 21 are of different constructions, as is apparent from FIGS. 1 and 2. The two bowls 20 and 21 are designed and constructed for being positioned on the support surface 15.

The first bowl 20 has a bottom wall 22 which is substantially planar. The first bowl 20 further comprises a side wall 23 of substantially hollow cylindrical shape. The bowl 20 further has a lid C which is provided with a feed tube 24. An angled operating stud 25 projects laterally from the lid C. The operating stud 25 is designed for co-operating with a safety switch not shown in FIG. 1, which principle has been known for a long time. The lid C is provided with a bearing sleeve 26 in its central region, which sleeve is coaxial with the shaft 13 during operation, the purpose of which will be explained in more detail further below. The first bowl 20 further has a handle 27. The first bowl 20 further comprises a tubular inner portion 28 which rises from the bottom wall 22 into the interior of the bowl, which has a first end 29 remote from the bottom wall 22 and a second end 30 facing the bottom wall 22, and which is open at both ends 29 and 30.

The second bowl 21 has a curved, cup-shaped bottom wall 31 which merges into a substantially hollow cylindrical side wall 32. An angled operating stud 33 projects from the side wall 32, fulfilling the same function as the operating stud 25 of the first bowl 20. The second bowl 21 is open in its region remote from the bottom wall 31, SO that no lid is provided for the second bowl 21. The second bowl 21, like the first bowl 20, has a tubular inner portion 34 rising from the bottom wall 31 into the interior of the bowl, which portion has a first end 35 remote from the bottom wall 31 and a second end 36 facing the bottom wall 31 and is open at both ends 35 and 36. The tubular inner portion 34 of the second bowl 21 is different in shape and construction from the tubular inner portion 29 of the first bowl 20. The tubular inner portion 34 of the second bowl 21 is of a dual construction and consists here of a first component piece 37 integrally connected to the bottom wall 31 and tapering in a direction away from the bottom wall 31, and of a second component piece 38 which is an extension of the first component piece 37 and which is retained to the first component piece 37 by means of locking arms 39 and 40. The second component piece 38 has a passage 41 at its free end which serves as a bearing sleeve for a transmission piece, which will be explained in more detail further below.

The first bowl 20 is provided and constructed primarily for carrying out cutting operations. A first tool 42 may for this purpose be introduced into the first bowl 20, which tool is a cutting tool 42 with two cutter blades 43 and 44. A second tool 45 may also be introduced into the bowl 20, which tool is indicated diagrammatically only in FIG. 1 by means of a dash-dot line. The second tool 45 is a slicing disc by means of which a material introduced through the feed tube 24 may be, for example, cut into slices. The two tools 42 and 45 mentioned above are driven at comparatively high speeds. A third tool may furthermore be introduced into the first bowl 20, which tool is a mixing or kneading tool which can be driven at a comparatively high speed. Such a tool is known from food processors which are on the market at present.

The second bowl 21 is provided and constructed for carrying out operations in which the second drive means 17 drive a tool at a comparatively low speed. In the operational situation shown in FIG. 2, a fourth tool 46 has been introduced into the second bowl 21. The fourth tool 46 could be denoted a whipping tool, by means of which a creamy substance and similar substances can be prepared. The fourth tool 46 consists of a sleeve-type fastening part 47, which is stationary during operation and which is connected to an annular part 50 with external teeth 49 via a connecting ring 48. The fourth tool 46 further comprises a drive part 51 which is rotatable relative to the fastening part 47, in which drive part 51 two stirring or whipping beaters 52 and 53 are journaled by means of respective studs 54 and 55. Such beaters are often denoted balloon beaters. A gearwheel 56, 57 is fixedly connected to each stud 54, 55, respectively, which two gearwheels 56 and 57 are in engagement with the outer teeth 49. During operation, the drive part 51 is driven into rotation, with the result that the two gearwheels 56 and 57 roll over the outer teeth 49, whereby the balloon beaters 52 and 53 are driven into rotation.

A fifth tool may furthermore be introduced into the second bowl 21, however, this is not shown in the Figures. The fifth tool is a kneading tool provided with kneading hooks which can be driven into a comparatively slow rotation and which are provided and constructed for making dough. Such a tool is also known from kitchen machines present on the market at this moment.

The food processor 1 is advantageously fitted with a first transmission piece 60 and a second transmission piece 61. The two transmission pieces 60 and 61 are of different constructions in this case, as is apparent from FIGS. 1 to 5. The two transmission pieces 60 and 61 are permanently connected neither to one of the two bowls 20 and 21 nor to the second drive means 17; instead, the two transmission pieces 60 and 61 can be connected to the second drive means 17, as desired, and can be detached from the second drive means 17 again, and they can be combined with either of the two bowls 20 and 21, and can be detached therefrom again. Each transmission piece 60, 61 is associated with a respective bowl 20, 21 and at least one of the tools 42 and 45 or 46. Furthermore, each transmission piece 60, 61 can be introduced by at least a portion thereof into the tubular inner portion 28, 34 of the respective bowl 20, 21. Furthermore, each transmission piece 60, 61 is constructed such that it renders it possible to realize an operational connection with the second drive means 17 and with a tool 42 and 45 or 46 associated with the transmission piece 60, 61, as applicable. Furthermore, each transmission piece 60, 61 is advantageously constructed so as to prevent the realization of an operational connection with a tool 46 or 42 and 45 not associated with the respective transmission piece 60, 61, which will be explained in more detail with reference to FIGS. 3, 4, and 5 below.

The first transmission piece 60 is associated with the first bowl 20 and the first tool 42 and the second tool 45, as well as with the third tool mentioned above but not shown. The second transmission piece 61 is associated with the second bowl 21 and the fourth tool 46, as well as with the fifth tool mentioned above but not shown.

The first transmission piece 60 is formed by an inner sleeve portion 62 to which an outer sleeve portion 64 is connected by means of a ring portion 63. A sleeve-type extension 65 projects in axial direction from the inner sleeve portion 62 in the region of the ring portion 63. In the region of the free end 66 of the sleeve-type extension 65, which free end 66 forms the first end 66 of the first transmission piece 60 remote from the second drive means 17, the first transmission piece 60 is provided with a bearing stud 67, which bearing stud 67 is designed for cooperating with the bearing sleeve 26 provided in the lid C for the first bowl 20. The first transmission piece 60 can be introduced with its inner sleeve portion 62 into the tubular inner portion 28 of the associated first bowl 20 exclusively through the first end 29 of the tubular inner portion 28 of the first bowl 20 associated with the first transmission piece 60, which end is remote from the bottom wall 22. Coupling means (not shown) are provided in the region of the free end 68 of the inner sleeve portion 62 of the first transmission piece 60 facing the bottom wall 22, whereby an operational connection to the first drive part 18 of the second drive means 17 can be achieved.

The second transmission piece 61 is substantially in the form of a sleeve and consists of a first sleeve portion 69 of substantially constant sleeve diameter and a second sleeve portion 70 with a second sleeve diameter widening in a direction away from the first sleeve portion 69, and a drive cap 71 which is provided at the first end 72 of the second transmission piece 61 remote from the second drive means 17. In the end 73 of the second transmission piece 61 facing the second drive means 17, the second sleeve portion 70 is fitted with coupling means (not shown) by which an operational connection to the second drive part 19 of the second drive means 17 can be achieved. The drive cap 71 is provided for cooperating with a counterpiece 74, which counterpiece is provided on the fourth tool 46 associated with the second transmission piece 61 and the second bowl 21, as well as on the fifth tool (not shown). The second transmission piece 61 can be introduced with its first sleeve portion 69 and its second sleeve portion 70 into the tubular inner portion 34 of the associated second bowl 21 exclusively through the second end 36 of the tubular inner portion 34 of the second bowl 61 facing the bottom wall 31, associated with this second transmission piece 61.

Several different situations will be described below which may occur in the food processor 1 of FIGS. 1 to 5. Two situations (see FIGS. 1 and 2) among the situations described below are desirable, because they are correct operational situations, whereas a few other situations (cf. FIGS. 3, 4, and 5) are undesirable, which is why these undesirable situations are advantageously prevented by the transmission pieces 60 and 61.

FIG. 1 shows a desirable operational situation of the food processor 1. The situation shown in FIG. 1 is achieved in that first the first bowl 20 is placed on the support surface 15 of the food processor 1, whereupon the first transmission piece 60 is introduced into the first bowl 20, which achieves an operational connection between the first drive part 18 of the second drive means 17 and the first transmission piece 60, after which the first tool 42 is placed on the first transmission piece 60, which achieves an operational connection between the first transmission piece 60 and the first tool 42. Then the lid C is placed on the side wall 23 of the first bowl 20 and is subsequently rotated with respect to the side wall 23 of the first bowl 20, which forces the operating stud 25 into that operational position in which it causes an operation of the safety switch. It is then possible to switch on the motor M of the food processor 1, so that a substance introduced through the feed tube 24 into the first bowl 20 is cut up by the first tool 42.

Figure 2:
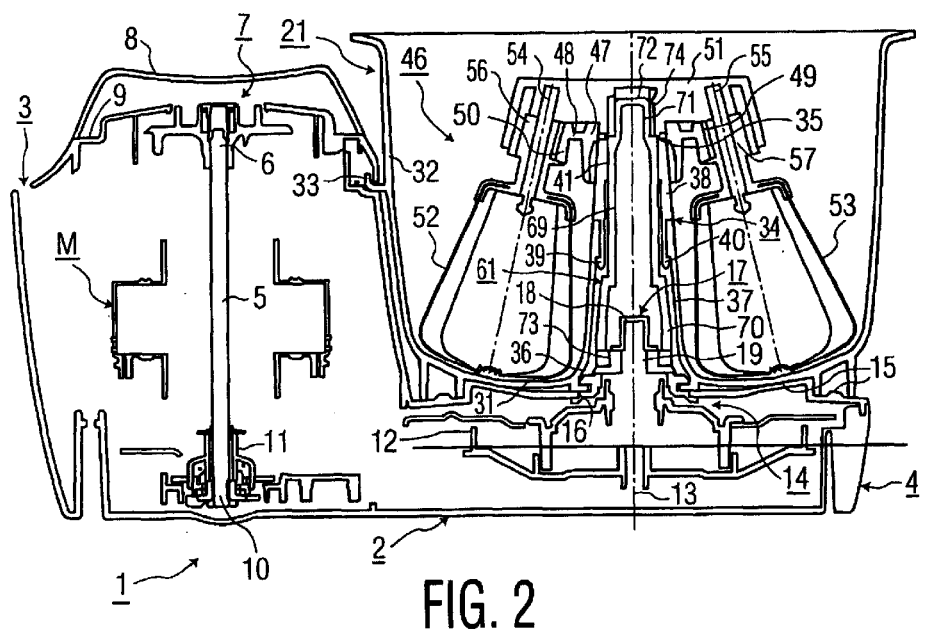
FIG. 2 shows the food processor of FIG. 1 in the same manner as in FIG. 1, but now a second bowl is positioned on the support surface of the food processor, and a second transmission piece and a fourth tool have been inserted into the second bowl.

FIG. 2 shows a second desired operational situation of the food processor 1. This situation is reached in that either first the second transmission piece 61 is placed on the second drive means 17 and subsequently the second bowl 21 is passed over the second transmission piece 61 and placed on the support surface 15, or the second transmission piece 61 is first introduced into the tubular inner portion 34 of the second bowl 21 and subsequently the second bowl 21 together with the introduced second transmission piece 61 is placed on the support surface 15. Both cases will lead to an operational connection between the second drive part 19 of the second drive means 17 and the second transmission piece 61. The fourth tool 46 is subsequently placed on the tubular inner portion 34 of the second bowl 21, for which the fastening part 47 is turned tightly onto the second component piece 38 and the drive cap 71 enters the counterpiece 74, which leads to an operational connection between the drive cap 71 and the counterpiece 74, and accordingly the drive part 51. The motor M may then be switched on, which will drive the balloon beaters 52 and 53.

Figure 3:
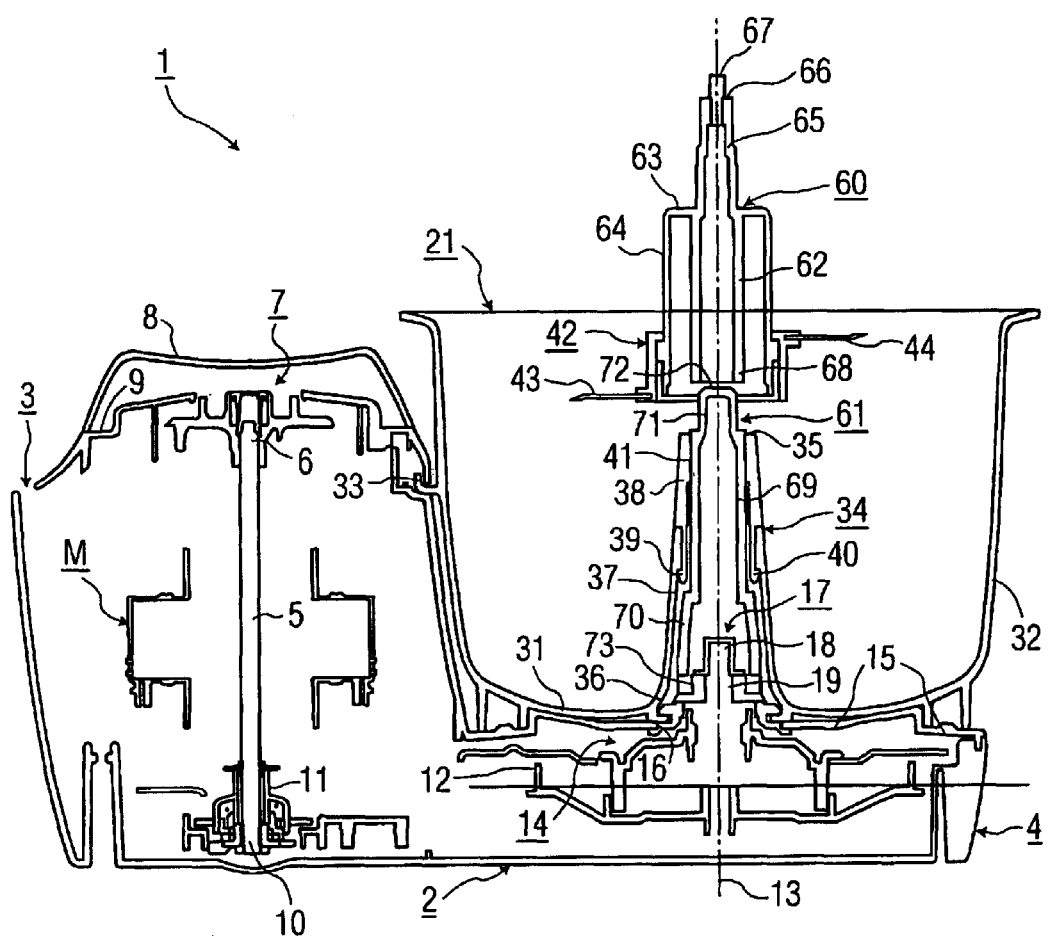
FIG. 3 shows the food processor of FIGS. 1 and 2 in the same manner as in FIGS. 1 and 2, such that again the second bowl is positioned on the support surface of the food processor, and the second transmission piece has been inserted into the bowl, while in addition the first transmission piece is shown with the first tool provided thereon.

FIG. 3 shows a situation which is undesirable for the food processor 1 and which should accordingly be prevented. In the situation shown in FIG. 3 it is assumed that a user of the food processor 1 attempts to introduce the first transmission piece 60 together with the first tool 42 present thereon into the second bowl 21, while this second bowl 21 is positioned on the support surface 15 and the second transmission piece 61 has been introduced into the tubular inner portion of the second bowl 21. This is advantageously impossible because the drive cap 71 is designed for preventing an operational connection to a tool not associated with the second transmission piece 61 from being realized, i.e. also to the first tool 42. The two transmission pieces 60 and 61 of the food processor 1 are indeed constructed such that the first transmission piece 60 has a certain transmission piece cross-sectional shape at its second end 68 facing the second drive means 17 and at the inner sleeve portion 62 which can be introduced into the tubular inner portion 18 of the first bowl 20, and that the drive cap 71 has a certain drive cap cross-sectional shape, which drive cap cross-sectional shape is taken to be different from the transmission piece cross-sectional shape for preventing an operational connection from being realized. As is evident from FIG. 3, the drive cap cross-sectional shape is chosen to be so great in relation to the transmission piece cross-sectional shape that the inner sleeve portion 62 cannot be passed over the drive cap 71.

It should further be noted with respect to the undesirable situation shown in FIG. 3 that it is indeed possible to pass the first transmission piece 60 partly over the tubular inner portion 34 of the second bowl 21 in the case in which the second transmission piece 61 has not beenintroduced into the second bowl 21 and the second bowl 21 is placed on the support surface 15 of the food processor 1 without the second transmission piece 71, but this will not lead to an operational connection between the second drive means 17 and the first transmission piece 60 because the outer sleeve portion 64 of the first transmission piece 60 will come to rest on the tubular inner portion 34 of the second bowl 21 before an operational connection is achieved between the end 68 of the inner sleeve portion 62 of the first transmission piece 60 facing the second drive means 17 and the first drive part 18 of the second drive means 17.

Figure 4:
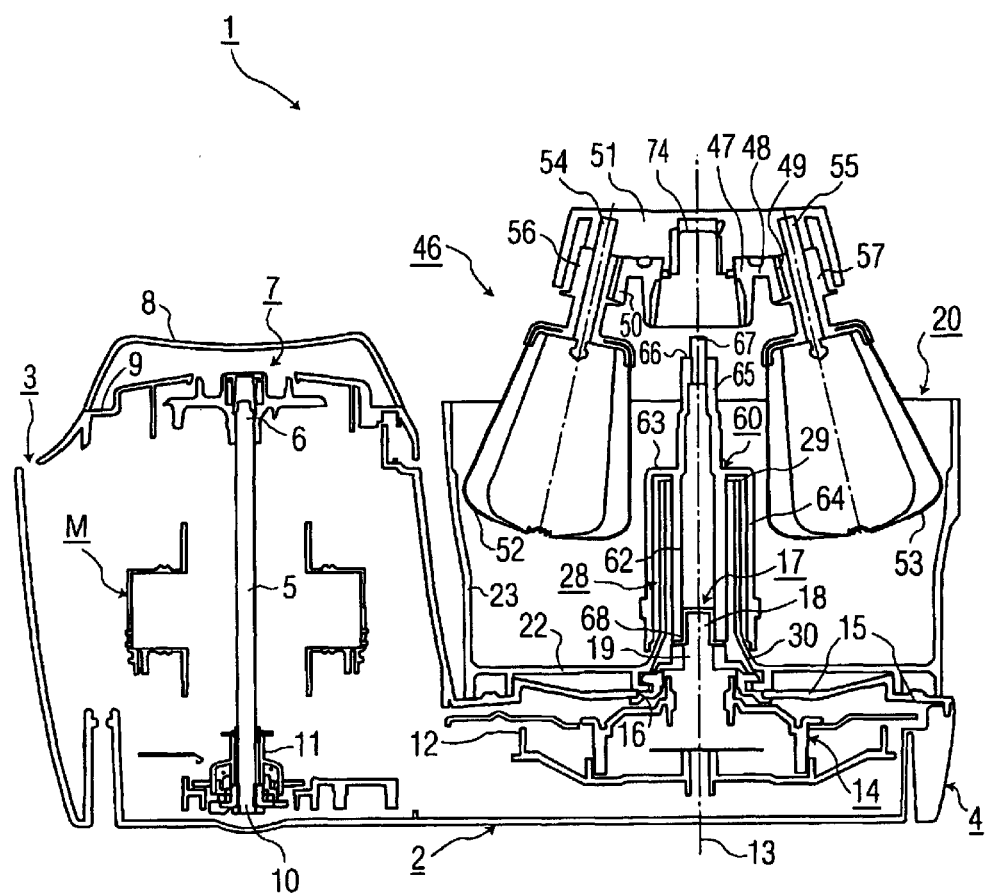
FIG. 4 shows the food processor 1 of FIGS. 1 to 3 in the same manner as in FIGS. 1 to 3, with the first bowl positioned on the support surface of the food processor and with the first transmission piece inserted into the first bowl, while in addition the fourth tool of the food processor is shown.

FIG. 4 shows a further situation which is undesirable in the food processor 1 and which is advantageously prevented in this case by the first transmission piece 60. FIG. 4 shows a situation in which a user of the kitchen machine 1 attempts to introduce the fourth tool 46 into the first bowl 20 which, however, is not associated with the fourth tool 46. The introduction of the fourth tool 56 is indeed hampered by the balloon beaters 52 and 53, but not fully prevented thereby because the beaters 52 and 53 are of a comparatively flexible construction. Even if the beaters 52 and 54 were pushed down to very close to the bottom wall 22 of the first bowl 20, it is advantageously ensured in the food processor 1 that no operational connection is achieved between the first transmission piece 60 and the fourth tool 46. This is because the bearing stud 67 is constructed so as to prevent an operational connection being formed with a tool not belonging to the first transmission piece 60, i.e. also the fourth tool 46. Should it be attempted to introduce the fourth tool 46 as far as possible into the first bowl 20, the bearing stud 67 will hit against the drive part 51, which prevents the creation of an operational connection. In addition, this leads to the situation that the bearing stud 67 is covered by the drive part 51, and as a result the lid C cannot be placed on the first bowl 20, so that the lid C is also incapable of operating the safety switch of the food processor 1 with its operating stud 25, which has the result that the food processor 1 cannot be switched on.

Figure 5:
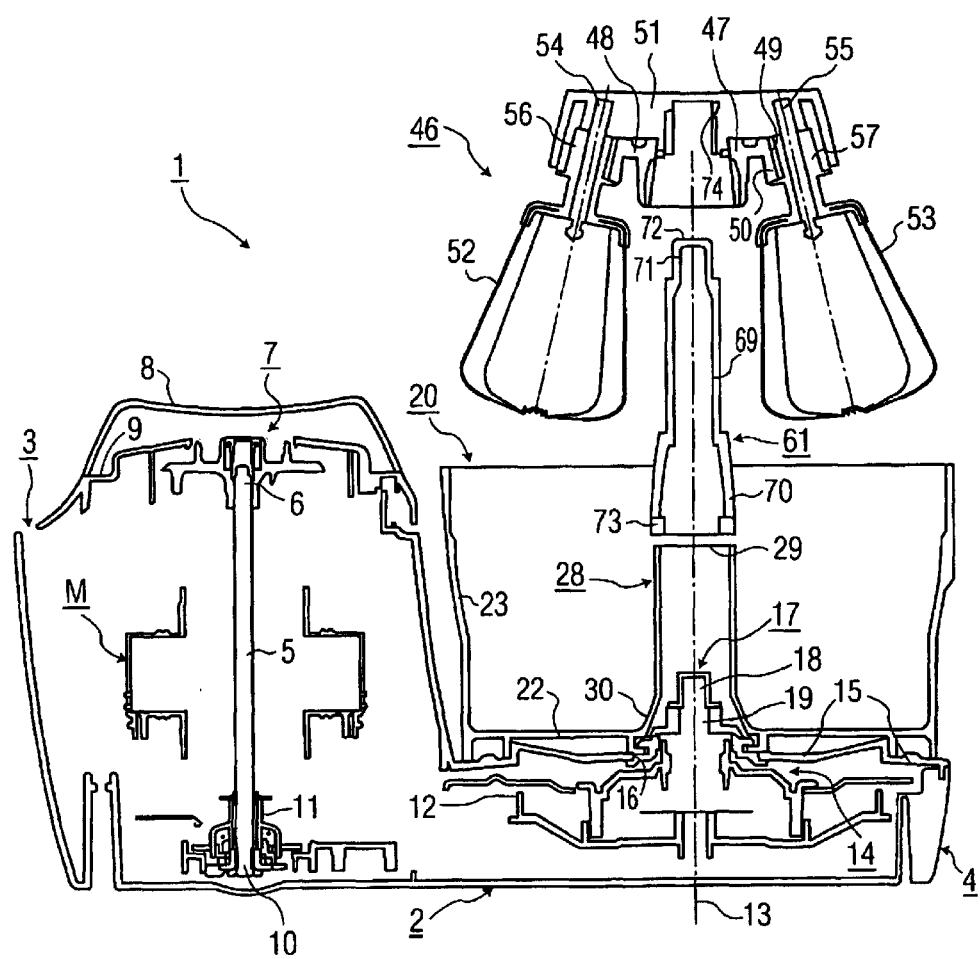
FIG. 5 shows the food processor of FIGS. 1 to 4 in the same manner as in FIGS. 1 to 4, wherein the first bowl is positioned on the support surface of the food processor, and wherein in addition the second transmission piece and the fourth tool of the food processor are shown.

FIG. 5 shows a further situation which is undesirable in the food processor 1, which situation is now advantageously prevented by the second transmission piece 61. In the situation shown in FIG. 5, a user of the food processor 1 attempts to introduce the second transmission piece 61 into the first bowl 20. This is prevented in a simple manner in the food processor 1 in that the second transmission piece 61 has a certain transmission piece cross-sectional shape at its second end 73 facing the second drive means 17 and at its outer sleeve portion 64 which can be introduced into the tubular inner portion 34 of the second bowl 21, and in that the tubular inner portion 28 of the first bowl 20 has a certain inner portion cross-sectional shape, which inner portion cross-sectional shape is made to be different from said transmission piece cross-sectional shape so as to prevent the realization of an operational connection. It is prevented in a simple manner thereby that the second transmission piece 61 can be inserted into the first bowl 20.

It is clear from the above description of the food processor 1 that undesirable situations are prevented in a simple and reliable manner by means of the transmission pieces 60 and 61 in the food processor 1.

Only two bowls 20 and 21 and two transmission pieces 60 and 61 are provided in the food processor 1 described above. It is alternatively possible to provide more than two bowls and more than two transmission pieces in a food processor in accordance with another embodiment of the invention, for example three, four, five, or even more, should this be useful and required. It is also possible for yet further tools to be provided in a food processor according to the invention. A tool may also be fixedly connected to a transmission piece, for example the first tool 42 may be fixedly connected to the first transmission piece 60.

In the food processor 1 described above, the second transmission piece 61 can be inserted only through the second end 36 of the tubular inner portion 34 of the second bowl 21 facing the bottom wall 31. This need not necessarily be the case, because, given a suitably chosen arrangement of a tubular inner portion 34 and a second transmission piece 61, this second transmission piece 61 may alternatively be inserted via the first end 35 of the tubular inner portion 34 remote from the bottom wall 31 into the tubular inner portion 34 of the accordingly constructed second bowl 21.

In the food processor 1 described above, the second drive means 17 arranged adjacent the support surface 15 are designed to drive the tools of the food processor 1 above the level of the support surface 15. Such second drive means, however, may alternatively be arranged substantially at the level of the support surface 15, or below the level of the support surface 15, in which case the transmission pieces will be of an accordingly longer construction.

The bearing stud 67 and the drive cap 71 play an important part in the food processor 1 described above as regards the prevention of an inadmissible combination of a bowl and a tool not belonging to this bowl. It should be expressly noted here, however, that alternative preventive solutions are possible, for example, different cross-sectional shapes may be provided for this purpose.

It should once more be noted that a food processor according to the invention may also be constructed such that a first transmission piece and a second transmission piece are not of different, but of the same construction, and that a first bowl and a second bowl are of different constructions, and that the tools associated with these respective bowls and with the transmission piece associated with the respective bowl are of different constructions.

What is claimed is:

1. A food processor with a support surface, and with a first bowl and a second bowl, which bowls are of different constructions, are designed for being placed on the support surface, each comprise a bottom wall, and each comprise a tubular inner portion rising from the bottom wall into the interior of the bowl, which inner portion has a first end remote from the bottom wall and a second end facing the bottom wall and is open at both ends, and with drive means arranged adjacent the support surface for driving tools of the food processor, and with at least two tools, which tools are of different constructions and are each associated with a respective bowl, and with a first transmission piece and a second transmission piece, which transmission pieces are permanently connected neither to a bowl nor to the drive means, wherein each transmission piece is associated with a respective bowl and with at least one too land can be introduced by at least a portion into the tubular inner portion of the associated bowl, and is constructed such that a transmission connection to the drive means and to a tool associated with the transmission piece can be realized and such that a transmission connection to a tool not associated with the respective transmission piece is prevented.

2. A food processor as claimed in claim 1, wherein the transmission pieces are of different constructions.

3. A food processor as claimed in claim 2, wherein the first transmission piece can be inserted with at least a portion thereof into the tubular inner portion of the associated first bowl exclusively via the first end of the tubular inner portion of the first bowl associated with the first transmission piece.

4. A food processor as claimed in claim 3, wherein the first transmission piece is provided with a bearing stud at a first end remote from the drive means, which bearing stud is designed for cooperating with a bearing sleeve which is provided in a lid (C) of the first bowl, and which bearing stud is constructed so as to prevent an operational connection from being realized to a tool which is not associated with the first transmission piece.

5. A food processor as claimed in claim 2, wherein the second transmission piece can be inserted with at least a portion thereof into the tubular inner portion of the associated second bowl exclusively through the second end of the tubular inner portion of the second bowl associated with the second transmission piece.

6. A food processor as claimed in claim 5, wherein the second transmission piece is provided with a drive cap at a first end remote from the drive means, which drive cap is designed for cooperating with a counterpiece which is provided on a tool associated with the second transmission piece and the second bowl, and which drive cap is designed for preventing an operational connection being realized to a tool which is not associated with the second transmission piece.

7. A food processor as claimed in claim 5, wherein the second transmission piece has a certain transmission piece cross-sectional shape at a second end facing the drive means and at the portion which can be inserted into the tubular inner portion of the second bowl, and wherein the tubular inner portion of the first bowl has a certain inner portion cross-sectional shape, which inner portion cross-sectional shape is formed differently from the transmission piece cross-sectional shape so as to prevent the realization of an operational connection.

8. A food processor as claimed in claim 1, wherein the first transmission piece has a certain transmission piece cross-sectional shape at a second end facing the drive means and at the portion which can be inserted into the tubular inner portion of the first bowl, and wherein the drive cap has a certain drive cap cross-sectional shape, which drive cap cross-sectional shape is formed differently from the transmission piece cross-sectional shape so as to prevent the realization of an operational connection.

9. A food processor as claimed in claim 1, wherein the drive means comprise a first drive part and a second drive part arranged coaxially with the first drive part, and wherein the first drive part is driven at a higher speed than the second drive part when the drive means are operated.

* * * * *